United States Patent Office 2,918,084
Patented Dec. 22, 1959

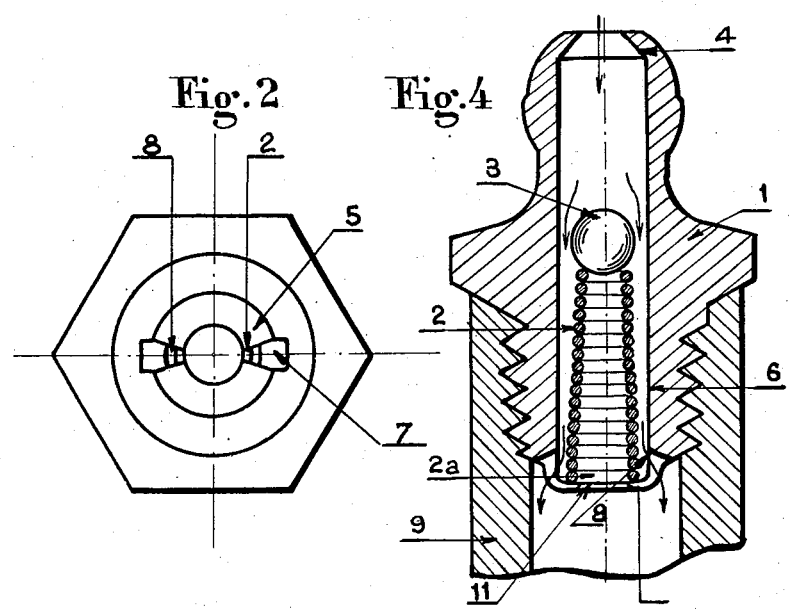
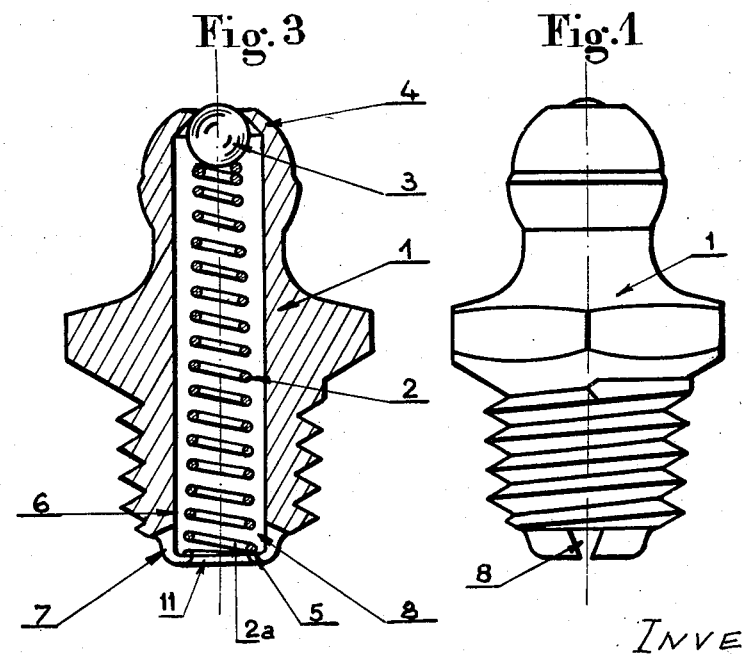

2,918,084

FULL-FLOW VALVED NIPPLE

Emile Madar, Paris, and Pierre Dive, Vincennes, France, assignors to "Comptoir Industriel de Paris," (Societe a Responsabilite Limitee), Charenton, France, a corporation of France Application May 16, 1955, Serial No. 508,647

Claims priority, application France May 18, 1954

1 Claim. (Cl. 137—539)

It is now current practice to close the inlet orifice of lubrication passages in mechanical components of automobiles with a fitting or nipple acting as a non-return valve and so designed that a coupler or nozzle may be fitted over the body of this nipple for connecting a pressure-lubrication battery or grease dispenser thereto and effect a periodical lubrication of the mechanical parts connected with the nipple. The nipple must be adapted to permit the passage of the lubricant dispensed by the lubrication battery under high-pressure conditions and to stop the inlet orifice of the relevant passage upon completion of the grease-dispensing operation.

The devices employed for this purpose consist generally of a hollow body having a constricted portion at either end, the constriction at the outer end of the nipple serving as a valve seat, the valve proper consisting as a rule of a ball located within the hollow body and normally seated by a coil spring also enclosed in the body and bearing against the inner constriction of the nipple. The inner end of the nipple communicates with the relevant lubrication passage. Thus, when a grease gun or like lubricant dispenser is applied on the body of a nipple of this general type the grease is forced therethrough under relatively high pressure and forces in turn the ball to move inwardly while compressing the coil spring, so that the grease will flow through the spring turns and then through the inner space of the spring before issuing from the body of the nipple through the constricted end communicating with the lubrication passage.

However, modern lubrication requirements lead to the use of increasingly higher pressures for delivering grease to automobile and truck parts. Yet the use of these very high pressures applies such stresses on the nipple valves that the spring designed to seat the ball is frequently compressed home so that its turns join each other and the spring finally forms a kind of tube with fluid-tight walls. Under these conditions the grease cannot flow through the nipple since after having unseated the ball and filled the space surrounding the spring it cannot escape across the spring turns to reach the outlet end of the nipple. Therefore, the amount of lubricant actually delivered to the mechanical part to be lubricated through the nipple is either null or very small if the spring turns leave but a narrow gap between each other.

Moreover, when the spring turns have been compressed home several times the compressive yield point of the spring proper is generally overstepped and the spring is distorted and looses its inherent resiliency and initial length, so that it becomes unsuitable for properly seating the valve.

Various solutions have been brought to this problem, for example, by using special springs having different degrees of flexibility, different pitches and diameters, etc., in view of limiting the compression at least in one portion of the spring. Other stopping members or obturators than balls have been proposed, with shapes designed to permit the passage of grease even when the spring has been fully compressed and forms a tubular body. However, so far as the applicants are aware, none of these solutions has proved entirely satisfactory, mainly because the manufacturers of ordinary springs are unable to guarantee very accurate load limits under economical conditions. On the other hand, the operation of certain devices may be satisfactory under a given pressure and defective under other pressure values; now it is obvious that grease nipples of the type fitted on passenger automobiles and trucks must operate successfully, i.e. ensure the longest possible useful life of the mechanical parts connected thereto, whether high-pressure lubrication guns of modern, large-size lubrication batteries or low-pressure, hand-operated grease guns are used for delivering grease thereto.

Now it is the essential object of this invention to provide a valved nipple of the general type disclosed hereinabove which is designed to permit the unobstructed flow of lubricant thereto, in the required non-return fashion, even when very high pressure lubricant-dispensing means are employed and under every circumstances, notably when the spring is compressed home and its turns contact each other so as to constitute a fluid-tight tube.

It is true that it has already been proposed that the spring be made to bear upon a loose spider at the outlet end of the hollow body, or upon inner shoulders formed within the hollow body itself and bent towards the axis, leaving between them notches which are situated on a plane which is perpendicular to the axis and which extend beyond the spring, of which the external diameter is less than the bore of the hollow body. First and foremost, it is evident that the monoblock lubrication nipple must be preferred to the nipple with the loose spider. But it is known that, for very high pressure lubrication nipples, on the one hand, the spring support must be very strong and, on the other hand, as regards lubricating nipples of automobiles vehicles in particular, the dimensions of the external thread of the hollow body are generally very limited, which implies a very reduced inner bore.

These requirements are fulfilled in the one-piece greasing nipple of the present invention according to which a greasing nipple for the injection of lubricants under pressure, utilizing an independent force-feed device, of the kind constituted by a hollow body enclosing a valve member pressed against a neck at the inlet end of the body, by a coiled spring bearing, at the outlet end of the body, against spaced tongues turning inwardly towards the axis thereof, the spring having an external diameter less than the bore of the hollow body at least at the level of the tongues, is characterized in that notches defined between the tongues are continued towards the inlet end along the periphery of the body parallel to its axis, to constitute supplementary passages additional to the central outlet hold, for the emergence of lubricant fed through the nipple.

Thus, even if the lubricant pressure is such as to cause the spring turn to contact each other and form a fluid-tight tube from the very beginning of the lubrication operation, the lubricant may flow nevertheless through the body of the nipple and then through the aforesaid radial notches to the lubrication duct, so that the pressure will drop very quickly and the valve moved back to allow the spring to expand somewhat; thus, the lubricant may flow through the turns and therefore through the main central outlet orifice.

The attached drawing illustrates diagrammatically by way of example the manner in which the invention may be carried out in the practice.

In the drawing:

Fig. 1 is an elevational view of the device;

Fig. 2 is a plan view from below of the device of Fig. 1;

Fig. 3 is an axial section of the device in its inoperative condition;

Fig. 4 is an axial section showing the spring in its fully-compressed condition at the beginning of a lubrication operation.

The hollow body 1 of the device is of known shape and contains also as already known a coil spring 2 and a ball 3 acting as a valve. This ball is urged by the spring 2 against a seat 4 forming a constricted portion at the inlet end of the body 1. The spring 2 bears with its opposite end 2a against an inner shoulder 5 formed at the outlet end of the body 1, this shoulder also forming a constriction obtained by upsetting inwardly the edge of the relevant end portion of the body 1.

According to this invention, a pair of radial notches or grooves 8 are formed in the body 1 adjacent to the outlet end thereof so that these notches or grooves lead into the lubrication passage or duct 9 provided on an automotive part on which the body 1 is mounted. These notches 8 are positioned externally of the spring 2 and the corresponding end 2a of this spring must be of smaller diameter than the inner space 6 of the body 1 so as to leave a free annular gap around this spring, as shown.

Preferably, the notches 8 are obtained by milling or otherwise machining a transverse or substantially diametral groove 7 in the outlet end of the body 1. This operation is performed before upsetting the edge 5 of the body; as a result, the notches 8 are somewhat distorted, but this is immaterial as will readily be seen in Fig. 1 of the drawing.

Fig. 4 illustrates the device under the conditions obtained at the beginning of a high-pressure lubrication operation, whereby the spring 2 is compressed home and its turns contact each other. Then the flow of lubricant will pass around the ball 3 and enter the annular space left between the tube constituted by the compressed spring and the inner wall of the body 1, and thus the lubricant will be allowed to flow through the notches 8 and feed the lubrication passage or duct 9. Consequently, grease may be dispensed to the part to be lubricated from the very beginning of the lubrication operation, and a pressure drop will take place very quickly so as to enable the ball 3 to move upwardly and the spring 2 to expand somewhat, at least to a degree sufficient to separate the turns thereof from each other and enable the lubricant to penetrate into the spring and be delivered through the main central orifice 11 of the body.

Even if for any fortuitous reason the spring 2 remained in its compressed condition the lubricant would nevertheless feed the lubrication passage 9 through the radial notches 8.

Of course, the form of embodiment shown in the drawing and described hereinabove is given by way of example and should not be construed as limiting the spirit and scope of the invention. Thus, the additional or auxiliary lateral or radial notches or grooves 8 may be formed in any other suitable manner, for example by longitudinal or transverse boring, different milling, etc., or by forming notches beforehand in the edge 5 of the outlet end, a similar result being also obtainable by not upsetting the edge 5 inwardly and maintaining the spring 2 at this end by means of simple lugs or projections bent inwardly so as to leave a free passage between these lugs or projections for permitting the flow of lubricant to the lubrication passage 9 outside the normal central orifice. Thus, any system whereby a complementary or adjacent passage is formed independently of the main central passage, so as to permit a pressure drop as the lubricant is delivered with a considerable force to the device, will remain within the scope of this invention.

Besides, the spring-loaded valve type illustrated is not restrictive and on the other hand the invention is also applicable to different stopping devices.

What we claim as new is:

A valve device, for the injection of lubricants, comprising in combination, a tubular hollow valve body having at one end thereof a valve seat and at the other end thereof a tubular rim portion forming a continuation of said valve body and an inwardly extending flange portion at the end of said rim portion, said tubular rim portion being coaxial with the longitudinal axis of the valve body, said flange portion constituting a central outlet orifice for said valve body and said rim portion being formed with at least one notch, said notch passing through the wall of said tubular rim portion and extending axially toward the valve seat to constitute a passage in addition to the central outlet opening; a valve member arranged in said valve body adapted to engage said valve seat, said valve member being in the form of a sphere of a substantially smaller diameter than the inner diameter of said hollow valve body; and a coil spring arranged in said valve body for continuously urging said valve member towards said valve seat, said coil spring abutting at one end thereof said valve member and at the other end thereof said flange portion, a diameter substantially less than the inner diameter of said hollow valve body at the end abutting against said flange portion, whereby when said valve member is forced away from said valve seat toward said other end of said valve body with such a force that it compresses said coil spring until adjacent turns thereof substantially abut each other so that said valve member and the thus-compressed coil spring forms a substantially fluid-tight tube closed at said one end thereof by said valve member, a fluid introduced through said one end of said valve body may flow through the same and out of said other end thereof by way of said notch of said tubular rim portion.

References Cited in the file of this patent

UNITED STATES PATENTS

| | | |
|---|---|---|
| 941,205 | Pollard | Nov. 23, 1909 |
| 1,671,609 | Roberts | May 29, 1928 |
| 1,707,977 | Davis | Apr. 9, 1929 |
| 2,400,817 | Fox | May 21, 1946 |
| 2,788,088 | Weston | Apr. 9, 1957 |

FOREIGN PATENTS

| | | |
|---|---|---|
| 418,730 | Great Britain | Oct. 30, 1934 |
| 577,637 | Great Britain | May 27, 1946 |
| 58,686 | France | Oct. 28, 1953 |